April 14, 1936.   G. A. LEYNER ET AL   2,037,516
ICE TRAY AND GRID
Filed Nov. 17, 1933

WITNESSES:
James R. Mosser
E. H. Lutz

INVENTORS
G. A. LEYNER and
W. B. ANDERSON
BY
ATTORNEY

Patented Apr. 14, 1936

2,037,516

UNITED STATES PATENT OFFICE 2,037,516

ICE TRAY AND GRID

George A. Leyner and William B. Anderson, Springfield, Mass., assignors to Westinghouse Electric & Manufacturing Company, East Pittsburgh, Pa., a corporation of Pennsylvania Application November 17, 1933, Serial No. 698,513

14 Claims. (Cl. 62—108.5)

Our invention relates to refrigeration apparatus and particularly to a novel apparatus for the production of frozen liquids in mechanical refrigerators.

It is an object of our invention to provide a flexible partition or grid for a liquid containing freezing pan which partition may be flexed to break the bond between the partition and the frozen liquid held by the partition, after removal thereof from the pan.

It is another object of our invention to provide a flexible partition for a liquid containing freezing pan which partition is preferably formed of metal and is flexible in all directions.

These and other objects are effected by our invention, as will be apparent from the following description and claims taken in connection with the accompanying drawing, forming a part of this application, in which:

Figure 1:
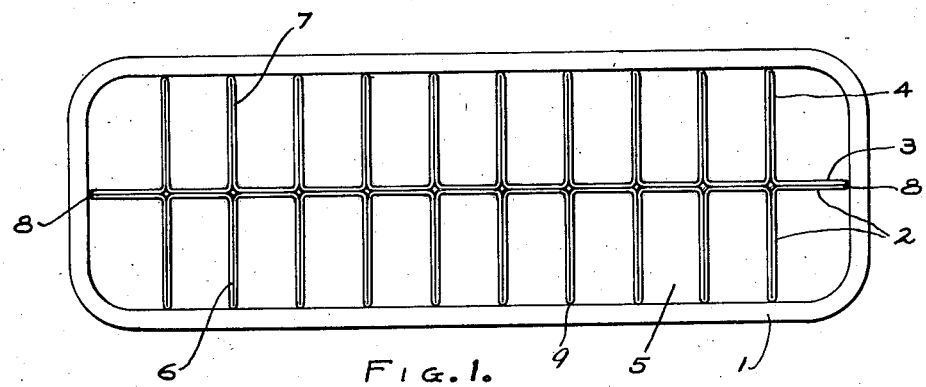
Fig. 1 is a top view of a liquid freezing pan containing my novel grid structure.
Figure 2:
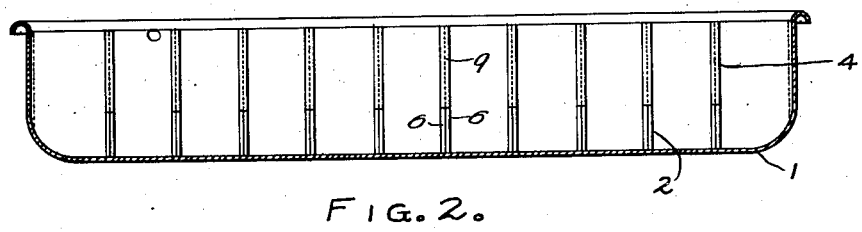
Fig. 2 is a sectional view of the pan with the grid shown in side elevation.
Figures 3, 4:
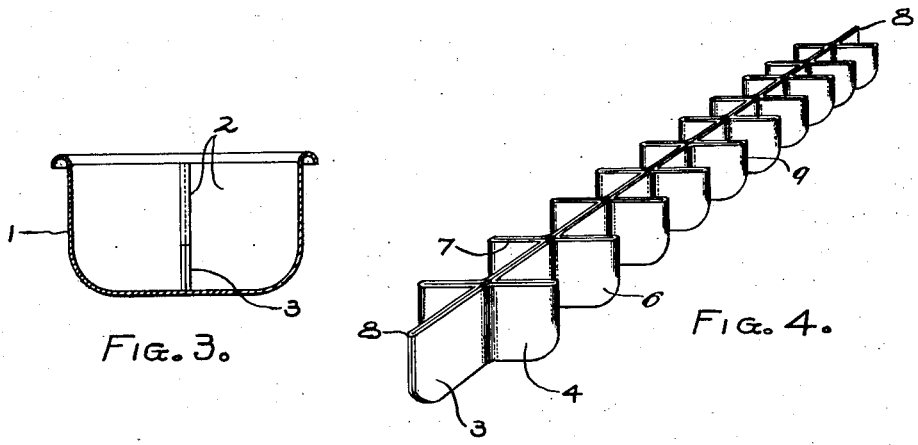
Fig. 3 is a sectional transverse view of the pan with the grid shown in end elevation.
Fig. 4 is a perspective view of our novel grid structure.

Referring specifically to the drawing for a detailed description of our invention, numeral 1 designates a liquid freezing tray preferably formed of metal, although it may be formed of any other suitable material, such as rubber. A grid or partition 2 is disposed in the pan and comprises walls 3 and 4 respectively, extending alternately longitudinally and transversely of the pan 1, so that substantially cubical chambers 5 are formed for the reception of liquids to be frozen. The walls 3 and 4 are all formed from two sheets of metal 6 and 7, preferably welded together at their ends 8. Except for the latter connection, the adjacent sheets are not joined to each other so that they are, to some extent, movable relative to each other. A preferred construction of the double walls 3 and 4 is shown, each sheet of metal forming one sheet of the longitudinal wall 3 and being bent at 9 to form the double walls 4.

After liquid has been frozen in the pan 1, the partition or grid 2 with the frozen liquid contained therein is removed from the pan in any suitable manner. Since the grid is flexible in any direction because of the construction of the walls 3 and 4, the bond between the frozen liquid and the partition 2 is easily broken and the frozen liquid removed from the grid by flexing the same.

From the foregoing, it will be apparent that we have provided a novel form of partition or grid for a liquid freezing tray, which partition is flexible in all directions to break the bond between the frozen liquid and the partition.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:

1. A receptacle for producing frozen ice cells comprising a pan and a flexible grid structure therefor dividing said pan into four corner cells and a series of intermediate cells disposed in rows and extending beween the corner cells, said grid structure embodying a longitudinal division wall and a series of spaced walls projecting transversely from opposite sides thereof, said walls extending about three sides of the intermediate cells and being formed of two flexible metallic sheets disposed contiguous to each other.

2. A receptacle as claimed in claim 1 wherein the transverse walls and one sheet of the longitudinal wall are formed of a unitary sheet of metal bent and folded to form three sides of said intermediate cells.

3. A receptacle as claimed in claim 1 wherein the sheets forming the transversely projecting walls are movable relative to each other.

4. A receptacle for producing frozen ice cells comprising a pan and a flexible grid structure therefor dividing said pan into four corner cells and a series of intermediate cells disposed in rows and extending between the corner cells, said grid structure embodying walls extending about three sides of said intermediate cells and each wall being formed of two flexible metallic sheets disposed in abutting relation with respect to each other and capable of relative movement therebetween.

5. A receptacle for producing frozen ice cells comprising a pan and a flexible grid structure therefor dividing said pan into a plurality of end cells and a series of intermediate cells disposed in a row and extending between the end cells, said grid structure including a strip of flexible sheet material bent and folded so as to provide first and second compartment wall defining parts, the first wall defining parts being substantially coplanar and the second wall defining parts extending at an angle to the first wall defining parts and from one side only of the latter, each of said second wall defining parts consisting of a doubled portion of said sheet material arranged in contact relation and joining ends of said first parts and folded at the extremity remote from the plane of said first parts.

6. A receptacle for producing frozen ice cells comprising a pan and a flexible grid structure therefor dividing said pan into four corner cells and a first and second series of intermediate cells disposed in rows and extending between the corner cells, said grid structure embodying walls extending about three sides of said intermediate cells and comprising sheet material formed to provide first and second longitudinally-extending contiguous parts, the first and second parts defining back walls of the first and second rows of cells, respectively, said parts also including folded and doubled portions of sheet material defining contiguous side walls of said first and second rows of cells, respectively.

7. A receptacle for producing frozen ice cells comprising a pan and a flexible grid structure therefor dividing said pan into four corner cells and a series of intermediate cells disposed in rows and extending between the corner cells, said grid structure embodying a longitudinal division wall and a series of spaced walls projecting transversely from opposite sides thereof, said walls extending about three sides of the intermediate cells and being formed of two flexible metallic sheets bent about substantially vertical axes and disposed contiguous to each other.

8. A removable flexible grid structure for dividing an ice tray into four corner cells and a series of intermediate cells disposed in rows and extending between the corner cells, said grid structure embodying a longitudinal division wall and a series of spaced walls projecting transversely from opposite sides thereof, said walls extending about three sides of the intermediate cells and being formed of two flexible metallic sheets, said grid structure being flexible in a direction transversely of the longitudinal wall and also being flexible in a direction transversely of the transverse walls.

9. A removable flexible grid structure for dividing an ice tray into four corner cells and a series of intermediate cells disposed in rows and extending between the corner cells, said grid structure embodying a longitudinal division wall and a series of spaced walls projecting transversely from opposite sides thereof, said walls extending about three sides of the intermediate cells and being formed of two flexible metallic sheets, said grid being flexible in a rotary direction when torsional movement is applied to the ends of the grid for facilitating removal of frozen liquid therefrom.

10. A removable flexible grid structure for dividing an ice tray into four corner cells and a series of intermediate cells disposed in rows and extending between the corner cells, said grid structure embodying a longitudinal division wall and a series of spaced walls projecting transversely from opposite sides thereof, said walls extending about three sides of the intermediate cells and being formed of two flexible metallic sheets disposed contiguous to each other, said grid structure being flexible in a direction transversely of the longitudinal wall of the grid.

11. A removable flexible grid structure for dividing an ice tray into four corner cells and a series of intermediate cells disposed in rows and extending between the corner cells, said grid structure embodying a longitudinal division wall and a series of spaced walls projecting transversely from opposite sides thereof, said walls extending about three sides of the intermediate cells and being formed of two flexible metallic sheets disposed contiguous to each other, said grid being flexible in a direction transversely of the transverse walls of the grid.

12. A flexible grid structure for dividing a pan for producing ice into four corner cells and a series of intermediate cells disposed in rows and extending between the corner cells comprising a flexible, longitudinally-extending division wall and a series of secondary walls projecting transversely from each side of said longitudinal wall and disposed in spaced relation with respect to each other to define opposing sides of said intermediate cells, the respective secondary walls being formed of two sheets of flexible metal disposed in abutting relation and joined at their outer ends and having their inner ends bent outwardly from each other adjacent the longitudinal division wall and secured, respectively, to the latter.

13. A flexible grid structure for dividing a pan for producing ice into four corner cells and a series of intermediate cells disposed in rows and extending between the corner cells comprising a flexible, longitudinally-extending division wall and a series of secondary walls projecting transversely from each side of said longitudinal wall and disposed in spaced relation with respect to each other to define opposing sides of said intermediate cells, the respective secondary walls being formed of a thin strip of flexible metal having its outer end folded so as to form said wall of two sheets of metal disposed contiguous to each other and having the inner termini of said sheets located on a common side of the axis of said longitudinal division wall.

14. A flexible grid structure for dividing an open pan into four corner cells and a series of intermediate cells disposed in rows and extending between the corner cells comprising a longitudinally-extending division wall and a series of secondary walls projecting transversely from each side of said longitudinal wall and disposed in spaced relation with respect to each other, both said longitudinal and secondary walls being composed of a double thickness of flexible sheet metal, the outer ends of the secondary walls being formed by a fold in the sheet metal, the upper and lower edges of the two thicknesses of metal forming the secondary walls being exposed, respectively, in the planes of the top and bottom of the grid structure and the inner ends of the two thicknesses of metal forming the secondary walls being bent away from each other and joining with a single thickness of metal forming the adjacent half of the longitudinal wall.

GEORGE A. LEYNER.
WILLIAM B. ANDERSON.